(12) United States Patent
Kieselbach et al.

(10) Patent No.: US 12,045,633 B2
(45) Date of Patent: Jul. 23, 2024

(54) SYNCING SETTINGS ACROSS INCOMPATIBLE OPERATING SYSTEMS

(71) Applicant: Microsoft Technology Licensing, LLC, Redmond, WA (US)

(72) Inventors: Kevin M. Kieselbach, Redmond, WA (US); Jeffrey Genovy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/307,469

(22) Filed: Apr. 26, 2023

(65) Prior Publication Data

US 2023/0266976 A1 Aug. 24, 2023

Related U.S. Application Data

(63) Continuation of application No. 17/183,278, filed on Feb. 23, 2021, now Pat. No. 11,669,340.

(51) Int. Cl.
*G06F 9/445* (2018.01)
*G06F 9/455* (2018.01)

(52) U.S. Cl.
CPC ...... *G06F 9/44505* (2013.01); *G06F 9/45533* (2013.01); *G06F 9/45545* (2013.01)

(58) Field of Classification Search
CPC ............. G06F 9/44505; G06F 9/45533; G06F 9/45545
See application file for complete search history.

(56) References Cited

U.S. PATENT DOCUMENTS

| | | | | |
|---|---|---|---|---|
| 7,500,090 | B2* | 3/2009 | Mondshine | G06F 9/4406 713/1 |
| 9,152,582 | B2* | 10/2015 | Reeves | G06F 13/4068 |
| 9,792,134 | B1* | 10/2017 | Whaley | G06F 9/44505 |
| 10,025,580 | B2* | 7/2018 | Paul | G06F 8/65 |
| 2006/0036832 | A1* | 2/2006 | Makiyama | G06F 9/455 712/1 |
| 2013/0326347 | A1* | 12/2013 | Albright | G06F 9/454 715/265 |

* cited by examiner

*Primary Examiner* — Brian T Misiura (57) ABSTRACT

Example aspects include techniques for syncing configuration settings between incompatible operating systems. These techniques may include determining, via a first application, system-wide configuration information associated with a host system configuration parameter and a first configuration value of the host operating system, and transmitting a synchronization notification to a second application executing on a guest operating system, wherein the synchronization notification corresponding to the system-wide configuration information. In addition, the techniques may include configuring a guest system configuration parameter to a second configuration value based on the synchronization notification, and executing a third application on the guest operating system based on the second configuration value.

20 Claims, 9 Drawing Sheets

SYNCING SETTINGS ACROSS INCOMPATIBLE OPERATING SYSTEMS

CROSS-REFERENCE TO RELATED APPLICATIONS

This application is a continuation of U.S. patent application Ser. No. 17/183,278 filed Feb. 23, 2021, titled "Syncing Setting Across Incompatible Operating Systems," which is incorporated herein by reference in its entirety.

BACKGROUND

A computing environment may provide a guest operating system executing within a virtual machine using virtualized resources. In some instances, a virtual machine may provide the capability to run software applications that are unavailable or inoperable on the underlying host operating system. For example, a guest operating system may provide a means for executing an older application no longer supported by a newer host operating system. Each virtual machine is isolated from its host physical system and other virtualized machines. Because of this isolation, a guest operating system has separate system settings, application settings, and user settings from the host operating system. In addition, the configurable settings of the host operating system and the guest operating system may have different nomenclature and/or acceptable values. As a result, guest applications executing within a virtual machine may suffer from poor usability, require frequent configuration activity, and present a steep learning curve to many users.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method may include determining, via a first application executing on a host operating system, system-wide configuration information associated with a host system configuration parameter and a first configuration value of the host operating system; transmitting a synchronization notification to a second application executing on a guest operating system, the synchronization notification corresponding to the system-wide configuration information; configuring, via the second application executing on the guest operating system, a guest system configuration parameter to a second configuration value based on the synchronization notification; and executing a third application on the guest operating system based on the second configuration value.

In another aspect, a device may include a memory; and at least one processor coupled to the memory and configured to: determine, via a first application executing on a host operating system, system-wide configuration information associated with a host system configuration parameter and a first configuration value of the host operating system; transmit a synchronization notification to a second application executing on a guest operating system, the synchronization notification corresponding to the system-wide configuration information; configure, via the second application executing on the guest operating system, a guest system configuration parameter to a second configuration value based on the synchronization notification; and execute a third application on the guest operating system based on the second configuration value.

In another aspect, an example computer-readable medium storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

This disclosure describes techniques for synchronizing system settings in a computing environment. In particular, aspects of the present disclosure provide syncing of configuration settings between a first host operating system and one or more incompatible guest operating systems.

In accordance with some aspects of the present disclosure, a computing system may include a first plurality of applications executing on a host operating system of the computing device, and a second plurality of applications executing within a guest operating system of the computing device. As used herein, in some aspects, an "application" may refer to software applications, mobile applications, mobile apps, computer programs, software programs, etc. Some examples of the applications that may execute within the host operating system and/or the guest operating system may include productivity applications, application stores, media applications, web browsers, calendar applications, navigation applications, video game applications, social media applications, fitness applications, etc. In addition, as used herein, in some aspects, a "host operating system" may refer to an operating system on the computing device that interacts with hardware of the computing device. As used herein, in some aspects, a "guest operating system" may refer to an operating system installed with a virtual machine of the computing device. Some examples of the host operating system or the guest operating system include Microsoft Windows operating systems, Google Chrome OS operating system, Google Android operating systems, Apple OS and iOS operating systems, Linux operating systems, BSD operating systems, and UNIX operating systems.

In addition, the operating systems may have system-wide configuration settings applicable to the first plurality of applications and the second plurality of applications, respectively. In addition, each individual application may have application-specific configuration settings. Some examples of configuration settings include, but are not limited to, language settings, date and time settings, accessibility settings, battery settings, location information settings, user settings, security settings, and/or a privacy settings. As used herein, in some aspects, an "incompatible guest operating system" may refer to a guest operating system with one or more settings parameters and/or settings values that are different from the host operating system. For example, the guest operating system may use the settings parameter "volume," and the host operating system may use the settings parameter "sound" or "master volume." As another example, the guest operating system may set the font size of text displayed by the guest operating system using a quantitative value (e.g., numeric font size), and the host operating system may set the font size of text displayed by the host operating system using a qualitative value (e.g., small, medium, large).

As described herein, the computing device may seamlessly synchronize system-wide configuration settings between the host operating system and the guest operating system and employ the host operating system to modify application settings of individual applications executing on the guest operating system to improve ease of use, usability, and/or user experience. For instance, as described in detail herein, the system-wide configuration settings of the guest operating system may be based on the system-wide configuration settings of the host operating system even when the configuration settings of the guest operating system are not identical to the configuration settings of the host operating system. For example, a user may update the language setting of the host operating system from English to Spanish, and the computing device may automatically update a corresponding setting of the guest operating system from English to Spanish even though the setting name or setting value for the language settings are not identical. Further, in some instances, a user may modify configuration settings for an application executing within the guest operating system using a settings management module of the host operating system. Additionally, in some instances, a user may be required to modify system-wide settings of the guest operating system by modifying the configuration settings of the host operating system. For example, if a user attempts to launch a settings management module of the guest operating system from within an application executing within the guest operating system, the computing device will instead present the setting management module of the host operating system, which is configured to modify the system-wide settings of the host operating system and the guest operating system.

Seamlessly synchronizing system-wide configuration settings between the host operating system and the guest operating system and employing the host operating system to modify application settings of individual applications executing on the guest operating system provides a uniform configuration (e.g., language, presentation, accessibility, etc.) and/or configuration process for applications executing within the host operating system and the guest operating system. Accordingly, the systems, devices, and methods described herein provide techniques for employing virtualization techniques to increase the amount of applications accessible on a computing device while increasing the usability and integration of guest applications executing on a guest operating system of the computing device.

Illustrative Environment

Figure 1:
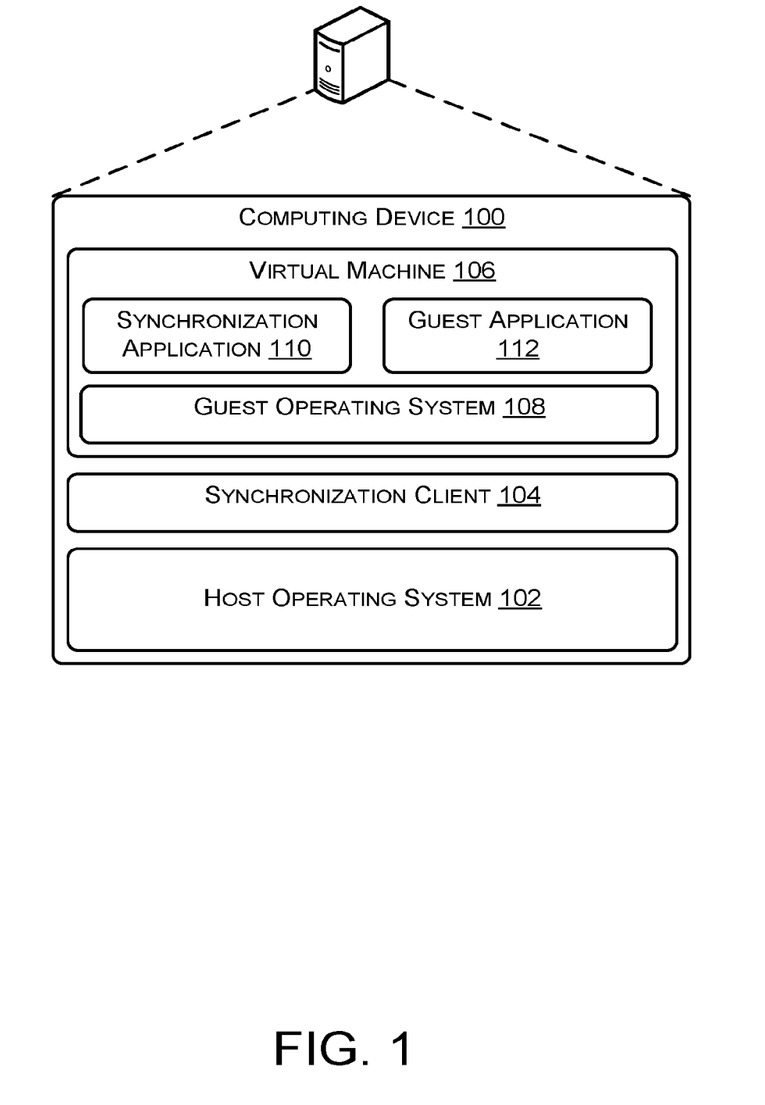
FIG. 1 is a diagram showing an example computing device for syncing configuration settings between incompatible operating systems, in accordance with some aspects of the present disclosure.

FIG. 1 is a schematic diagram showing an example computing device 100 for synchronizing configuration setting across incompatible operating systems, in accordance with some aspects of the present disclosure.

As illustrated in FIG. 1, the computing device 100 may include a host operating system 102 and a synchronization client 104 executing on the host operating system 102. Further, the computing device 100 may include a virtual machine 106 configured to provide virtualized resources to a guest operating system 108. In particular, a synchronization application 110 and a guest application 112 may execute on the guest operating system 108 using the virtualized resources provided by the virtual machine 106. Although FIG. 1 illustrates one virtual machine 106 operating on the computing device 100, the computing device 100 may include a plurality of virtual machines each implementing aspects of the present disclosure.

As described herein in detail, the synchronization client 104 and the synchronization application 110 may be configured to synchronize configuration settings between the host operating system 102 and the applications (e.g., the guest application 112) executing on the guest operating system 108. For example, the guest application 112 may be an electronic book (e-book) reader application. Further, a user of the computing device 100 may enable one or more accessibility features (e.g., keyboard, mouse, and screen options for users who have difficulty typing or viewing a display of the computing device 100) of the host operating system 102 to assist user interaction with the computing device 100. In some aspects, the synchronization client 104 may determine configuration information (e.g., the enabled accessibility settings and the values of the enabled accessibility settings selected by the user), and provide the configuration information to the synchronization application 110. Upon receipt of the configuration information, the synchronization application 110 may determine corresponding accessibility settings of the guest operating system 108, and enable the corresponding accessibility settings on the guest operating system 108 using values corresponding to the values selected by the user. As a result, the accessibility settings will also be applied to the applications executing on the guest operating system 108. For example when the user endeavors to read an e-book via the guest application 112, the user will have the benefit of the accessibility settings enabled for improving readability of documents within the host operating system 102.

Further, in some aspects, the host operating system 102 may be configured to provide similar operations for accessing application-specific configuration settings of applications executing on the host operating system (e.g., the synchronization client 104) and applications executing on the guest operating system 108 (e.g., the guest application 112). For example, the host operating system 102 may be configured to display a GUI that lists applications executing on the host operating system 102 and applications executing on the guest operating system 108. In addition, individual applications may be selectable within the list, and the host operating system 102 may be configured to cause display of a GUI for modifying the configuration settings of the guest application 112. In some instances, the host operating system 102 may be configured to cause the guest application 112 to display of a GUI for modifying the configuration settings of the guest application 112.

Additionally, in some aspects, the synchronization application 110 may be configured to detect request to modify the configuration settings of the guest operating system 108, and cause the host operating system 102 to display a GUI for modifying the configuration settings of the host operating system 102. In addition, once the user modifies the configuration settings within the GUI displayed by the host operating system 102, the synchronization client 104 may update the configuration settings of the guest operating system 108 in view of the modifications to the configuration settings of the host operating system 102. For example, the user may select a GUI control for updating the configuration settings of the guest operating system 108 while reading an e-book within the guest application 112. In response, the synchronization application 110 may cause the host operating system 102 to display a GUI for modifying the configuration settings of the host operating system 102, while prohibiting the guest operating system 108 from displaying a GUI for modifying the configuration settings of the guest operating system 108.

Figure 2:
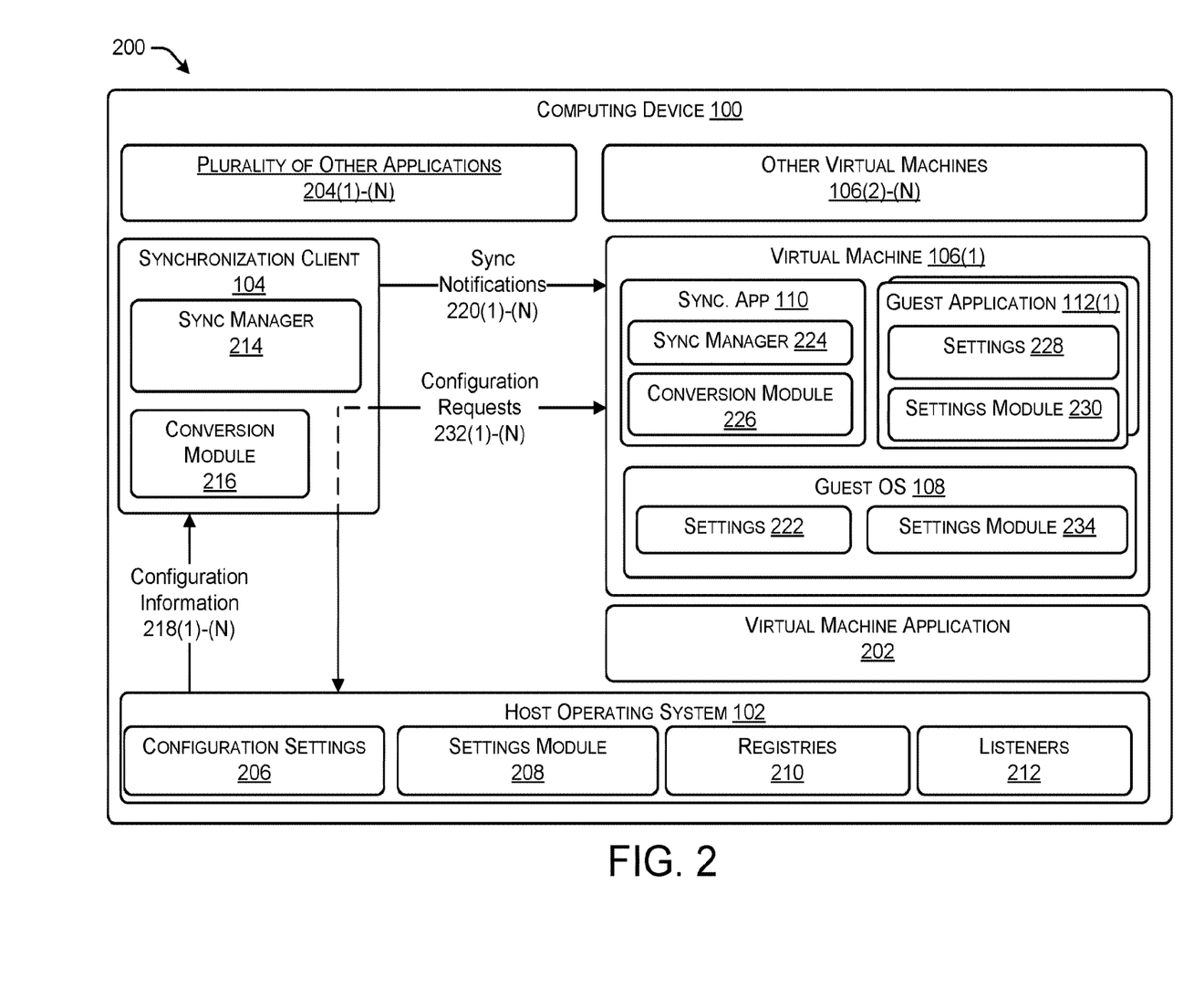
FIG. 2 is a schematic diagram showing an example computing architecture for syncing configuration settings between incompatible operating systems, in accordance with some aspects of the present disclosure.

FIG. 2 illustrates an example architecture 200 of the example computing device 100 for synchronizing configuration settings across incompatible operating systems, in accordance with some aspects of the present disclosure. As illustrated in FIG. 2, the computing device 100 may include the host operating system 102, the synchronization client 104, the virtual machine application 202, a plurality of other applications 204(1)-(N) executing on the host operating system 102, and one or more virtual machines 106(1)-(N) executing on the host operating system 102.

The host operating system 102 may include configuration settings 206 defining system-wide settings applicable to the host operating system 102, the synchronization client 104, the virtual machine application 202, the plurality of other applications 204, and/or the guest applications 112(1)-(N) of the virtual machines 106(1)-(N). For example, the configuration settings 206 may include, but are not limited to, the language settings, date and time settings, accessibility settings, battery settings, location information settings, user settings, security settings, and/or a privacy settings applicable to the host operating system 102, the synchronization client 104, the virtual machine application 202, the plurality of other applications 204, and/or the guest applications 112(1)-(N) of the virtual machines 106(1)-(N). Further, the host operating system 102 may include a settings module 208 configured to modify the configuration settings 206 and facilitate the modification of application-specific settings for the host operating system 102, the synchronization client 104, the virtual machine application 202, the plurality of other applications 204, and/or the guest applications 112(1)-(N) of the virtual machines 106(1)-(N). In addition, the host operating system 102 may include one or more registries 210 configured to store information on the applications installed on the computing device 100, and one or more listeners 212 configured to detect updates to the configuration settings 206 and notify the synchronization client 104 of the occurrence of an update.

The virtual machine application 202 may be configured to generate and execute the virtual machines 106(1)-(N). Further, the virtual machine application 202 may be configured to facilitate communications between the synchronization client 104 and the virtual machines 106(1)-(N). For example, in some aspects, the virtual machine application 202 may be configured to provide a channel over a virtual machine bus for communication between the synchronization client 104 and the virtual machine 106(1). In some aspects, the virtual machine application 202 may be a hypervisor.

The synchronization client 104 may be configured to determine configuration information 218, and provide the configuration information 218 to the synchronization application 110. Further, in some aspects, the synchronization client 104 may possess standard application privileges as opposed to one or more privileges associated with the host operating system 102 or a manufacturer of the computing device 100 or the host operating system 102. As illustrated in FIG. 2, the synchronization client 104 may include a synchronization manager 214 and a conversion module 216. The synchronization manager 214 may be configured to determine the configuration information based on the configuration settings 206. In some aspects, the configuration information may include a configuration parameter of the host operating system 102 and an acceptable configuration value for the configuration parameter within the host operating system 102. As an example, the configuration parameter may be "system language," and the configuration value may be "EN" which may represent a recent update of the "system language" to the English language in the host operating system 102.

In some instances, the synchronization manager 214 may determine the configuration information 218 by transmitting a request to the host operating system 102 for the configuration settings 206 and/or transmitting a request to the host operating system 102 for any updates to the configuration settings 206 over a predefined period of time (e.g., since the last request was transmitted). In response, the host operating system 102 may transmit the configuration information 218 to the synchronization client 104. In some aspects, the synchronization manager 214 may employ a public application programming interface (API) provided by the host operating system 102 to execute the request.

Additionally, or alternatively, the synchronization manager 214 may configure a listener 212 to transmit a listener notification to the synchronization manager 214 when the configuration settings 206 have been updated. In some instances, the listener notification may include the configuration information 218. In some other instances, the synchronization client 104 may request and receive the configuration information 218 in response to receipt of the listener notification.

Further, as illustrated in FIG. 2, the synchronization manager 214 may transmit a synchronization notification 220 to the virtual machine 106(1). In some aspects, the synchronization client 104 may employ the conversion module 216 to convert the configuration information 218, which is not usable by the guest operating system 108, to an intermediate representation, and transmit the intermediate representation within the synchronization notification 220. In some instances, the intermediate representation may be a platform-independent (i.e., independent of the parameters or values of the operating systems) representation of the configuration information 218 of the host operating system 102. Further, in some aspects, the platform independence of the intermediate representation may establish a contract that provides extensibility and stability, as any guest operating system may be used in accordance with the present disclosure if logic for converting from the intermediate representation to a representation compatible with the guest operating system is provided. In some aspects, transmitting the synchronization client 104 may include serializing the intermediate representation and transmitting the serialized information via a channel of a virtual machine bus provided by the virtual machine application 202.

As an example, the conversion module 216 may convert the configuration parameter "system language" of the configuration information 218 to an intermediate representation of "locale," and the configuration value "English" of the configuration information 218 to an intermediate representation of a language tag representing American English (e.g., "en-US", an Internet Engineering Task Force (IETF) best current practice (BCP) 47 tag). As another example, the conversion module 216 may convert the configuration parameter "geotracking" of the configuration information 218 to an intermediate representation of "location privacy," and the configuration value "enabled" of the configuration information 218 to an intermediate representation of "permit." In some aspects, the conversion module 216 may include mapping information that maps the configuration parameters and configuration values of the host operating system 102 to intermediate representations. Further, the conversion module 216 may determine the intermediate representations based on the mapping information. Additionally, or alternatively, in some aspects, the conversion module 216 may determine a configuration format of the guest operating system 108, and determine a destination representation based upon the configuration format of the guest operating system 108. Further, the synchronization manager 214 may transmit the destination representation within the synchronization notification 220. In some instances, the destination representation may be a representation compatible with and/or at least partially acceptable by the guest operating system 108.

The synchronization application 110 may configure the settings 222 of the guest operating system 108. For example, the synchronization manager 224 associated with the guest operating system 108 may receive the synchronization notification 220(1) and configure the settings 222 of the guest operating system 108 based on the synchronization notification 220(1). In some aspects, the synchronization manager 224 may employ the conversion module 226 to convert intermediate representations included in the synchronization notifications 220(1)-(N) to destination representations applicable using the guest operating system 108. For example, the conversion module 226 may convert the intermediate representation configuration parameter "locale" to a destination representation of "region," and the intermediate representation configuration value "en-US" to a destination representation of "United States." As another example, the conversion module 226 may convert the intermediate representation configuration parameter "location privacy" to a destination representation of "location tracking," and the intermediate representation configuration value "permit" to a destination representation of "allow." In some aspects, the conversion module 226 may include mapping information that maps the intermediate representations to configuration parameters and configuration values at the guest operating system information 108(1). Further, the conversion module 226 may determine the configuration parameters and configuration values based on the mapping information. Once the conversion module 226 determines the destination representations, the synchronization manager 224 may update the settings 222 based on the destination representations. For example, the synchronization manager 224 may set "location tracking" to "allow" within the settings 222. As a result, one or more location tracking operations performed by the guest application 112(1) will be permitted based on configuration settings 206. In some instances, the synchronization application 110 may require one or more elevated privileges to modify the settings 222 of the guest operating system 108. As such, the synchronization application 110 may possess one or more credentials associated with a developer and/or publisher of the guest operating system 108.

Further, as illustrated in FIG. 2, the guest application 112(1) may include settings 228 and a settings module 230 for configuring the settings 228 of the guest application 112. In some aspects, upon installation of the guest application 112 on the virtual machine 106(1), the guest application 112 may be registered within the one or more registries 210 of the host operating system 102. As a result of the registration, a custom link to the settings module 230 is associated with the guest application 112. Further, the custom link may be displayed within a configuration GUI for modifying application settings of individual applications installed on the host operating system 102. Upon activation of the custom link (e.g., a selection of the guest application 112 within the configuration GUI), the host operating system 102 may be configured to cause execution of the settings module 230 in order to permit modification to the settings 228 of the guest application 112(1). As a result, the configuration GUI presented to the user may be a centralized location for modifying the settings of applications on the computing device 100 independent of whether the application executes on the host operating system 102 or the guest operating systems 108(1)-(N). For instance, the settings module 208 may cause transmission of a configuration request 232(1) via the synchronization client 104 to the guest operating system 108 to execute the settings module 230. Alternatively, the settings module 208 may transmit the configuration request 232(1) directly to the guest operating system 108 without using the synchronization client 104. In some aspects, the guest operating system 108 may be the Google Android operating system, and the configuration requests 232(1)-(N) may be an Intent within the Google Android operating system.

Further, in some aspects, a user may endeavor to modify the settings 222 of the guest operating system 108 from the guest application 112(1). In some aspects, the action may be intercepted, and the guest operating system 108 and/or the synchronization manager 224 may transmit a configuration request 232 via the synchronization client 104 to the host operating system 102. Alternatively, the guest operating system 108 and/or the synchronization manager 224 may transmit the configuration request 232 directly to the host operating system 102 without using the synchronization client 104. In response to receipt of the configuration request 232, the host operating system 102 may execute the settings module 208, which may be configured to modify the configuration settings 206. As such, the user may be denied access to a native settings module 234 of the guest operating system 108 for modifying the settings 222. Instead, the user may be forced to make all modifications to the settings 222 using the same mechanism for modifying the configuration settings 206. In some aspects, the guest operating system 108 may be the Google Android operating system, and the intercepted action may be an Intent within the Google Android operating system.

Figure 3A:
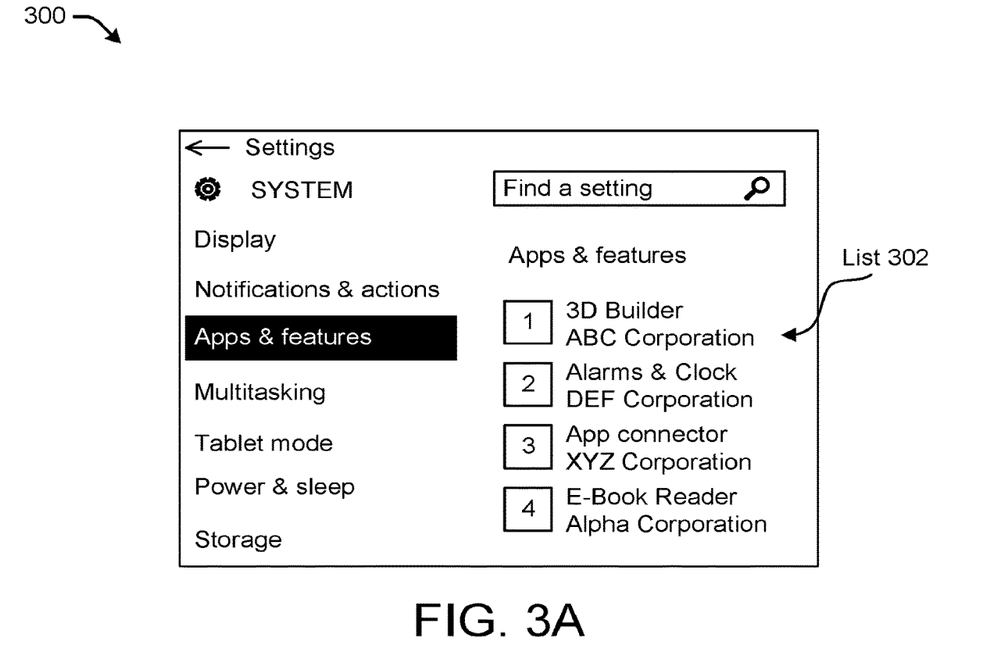
FIG. 3A illustrates a first example graphical user interface (GUI) for modifying configuration settings of a guest application within a host operating system, in accordance with some aspects of the present disclosure.
Figure 3B:
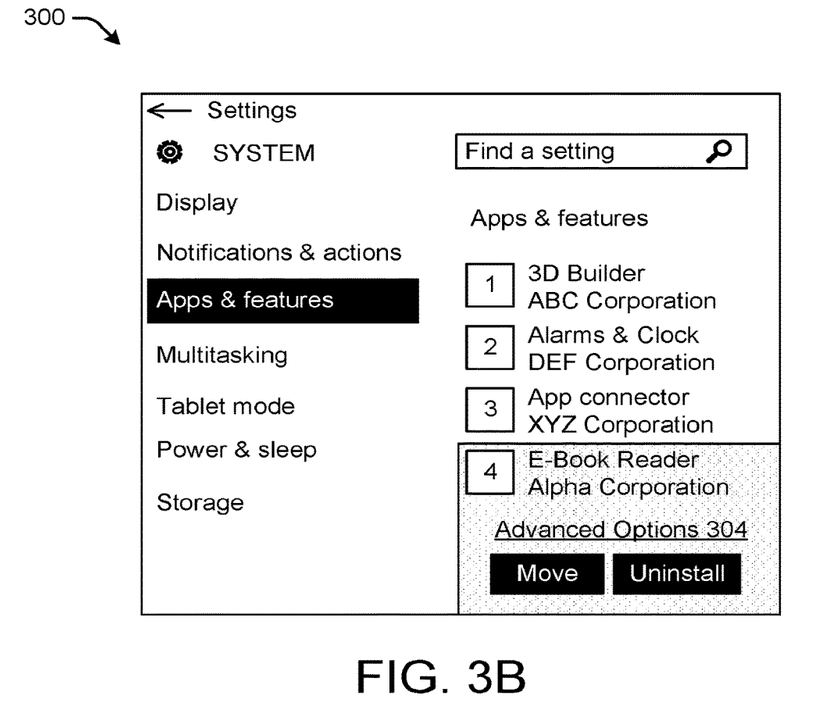
FIG. 3B illustrates a second example GUI for modifying configuration settings of a guest application within a host operating system, in accordance with some aspects of the present disclosure.
Figure 3C:
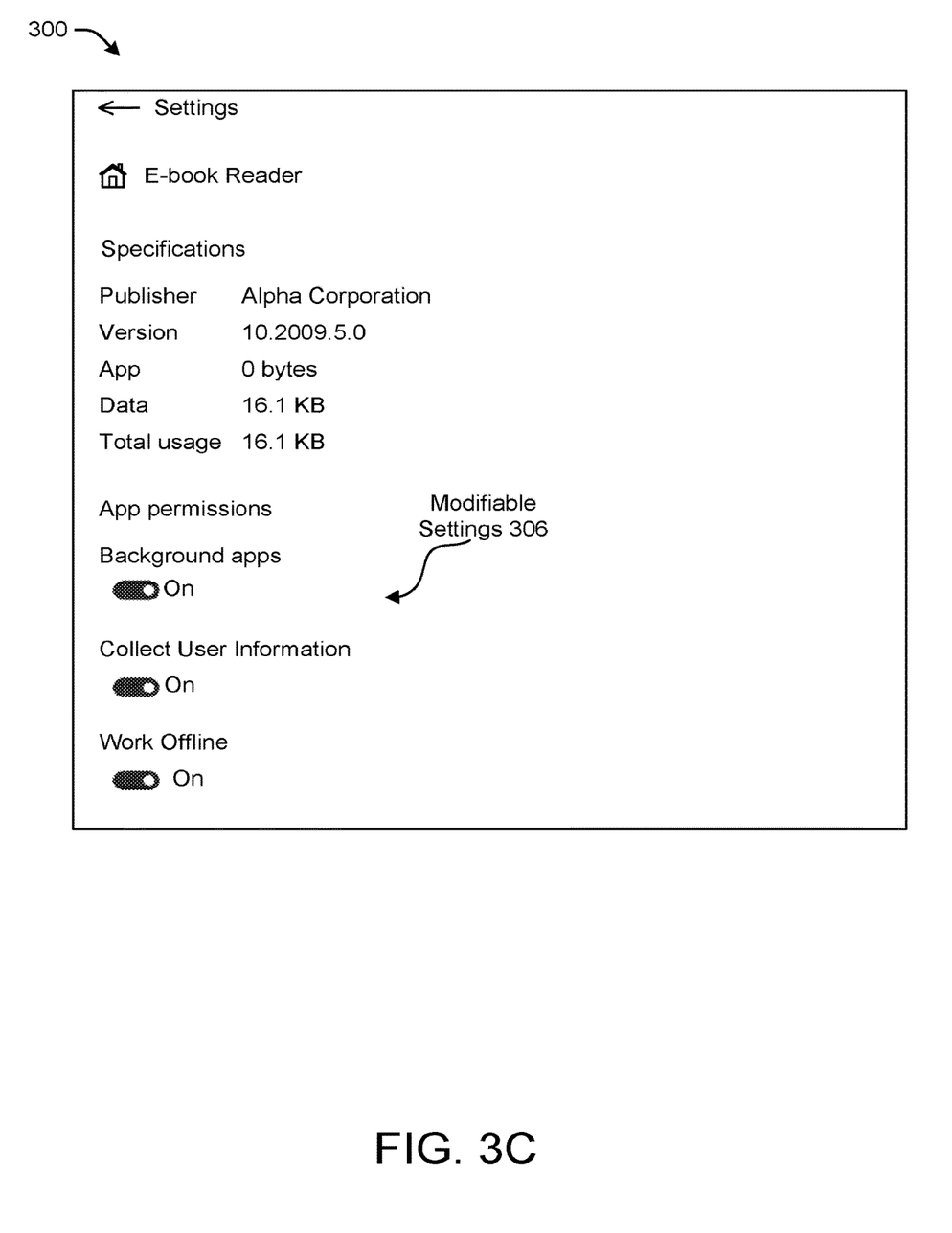
FIG. 3C illustrates a third example GUI for modifying configuration settings of a guest application within a host operating system, in accordance with some aspects of the present disclosure.

FIGS. 3A-3C illustrate a configuration GUI 300 configured to modify configuration settings of a guest application within a host operating system, in accordance with some aspects of the present disclosure. As illustrated in FIG. 3A, the host operating system 102 may display a configuration GUI 300 including a list 302 of the applications executing on the host operating system 102 and the applications executing on the virtual machines 106(1)-(N). Further, as illustrated in FIG. 3B, when a user selects an application within the list 302, the configuration GUI 300 may present an advanced options control 304. As illustrated in FIG. 3C, upon selection of the advanced options control 304, the configuration GUI 300 may display modifiable settings 306 for the selected application. For example, as described in detail herein, the host operating system 102 may be configured to cause execution of the settings module 230 in order to permit modification to the settings 228 of the guest application 112(1) within the configuration GUI 300. Further, in some aspects, the appearance and/or style (e.g., user interface elements, themes, fonts, etc.) of the settings module 230 within the configuration GUI 300 may differ from the appearance and/or style of the advanced options control 304. For example, the settings module 230 may employ a GUI library of the guest operating system 108 while the advanced options control 304 may employ a GUI library of the host operating system 102.

Figure 4A:
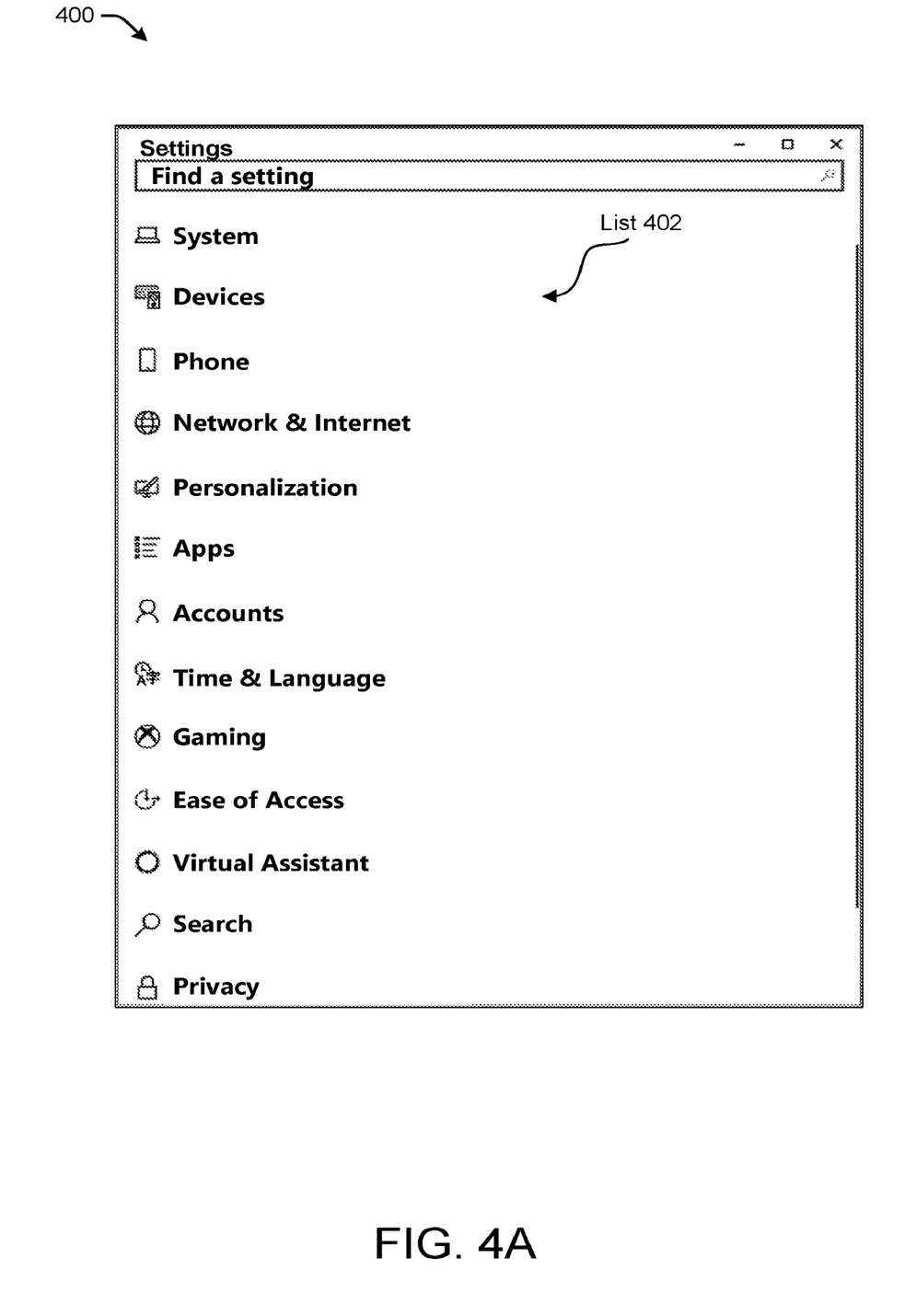
FIG. 4A illustrates a first example GUI for modifying configuration settings applied to host applications and guest applications, in accordance with some aspects of the present disclosure.
Figure 4B:
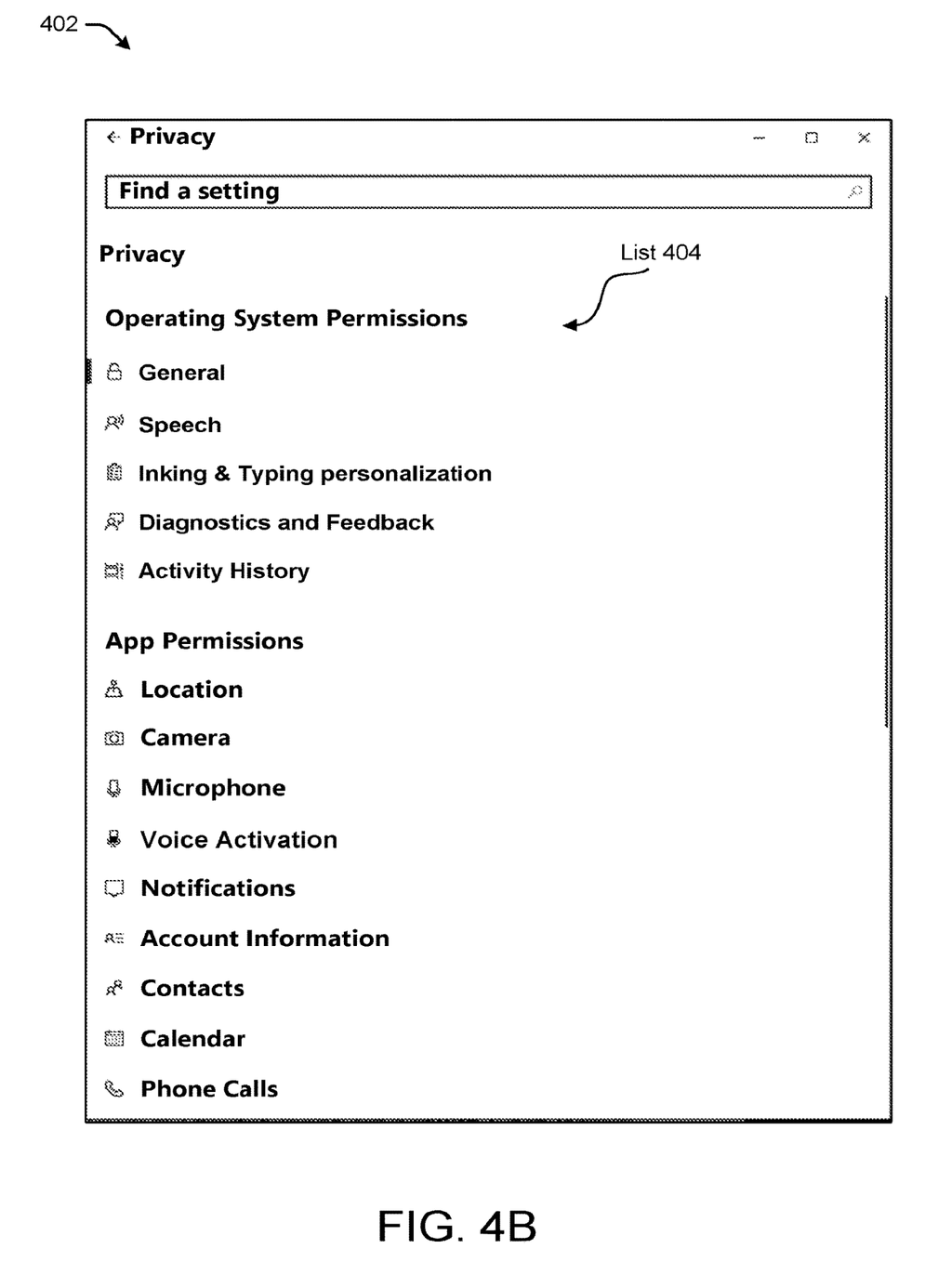
FIG. 4B illustrates a second example GUI for modifying configuration settings applied to host applications and guest applications, in accordance with some aspects of the present disclosure.
Figure 4C:
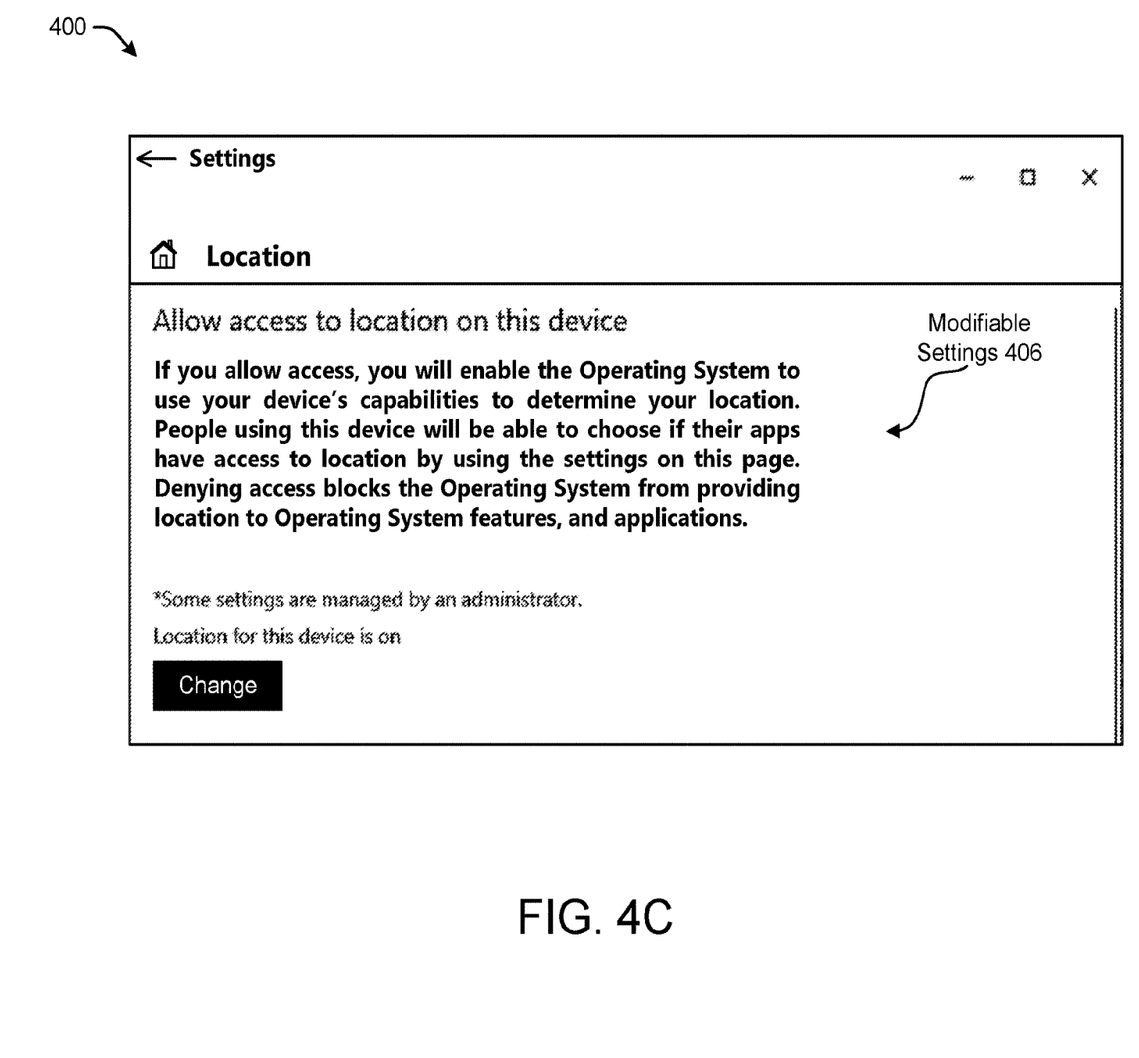
FIG. 4C illustrates a third example GUI for modifying system-wide configuration settings applied to host applications and guest applications, in accordance with some aspects of the present disclosure.

FIGS. 4A-4C illustrate a configuration GUI 400 configured to modify system-wide configuration settings applied to host applications and guest applications, in accordance with some aspects of the present disclosure. As illustrated in FIG. 4A, the host operating system 102 may display a configuration GUI 400 including a list 402 of categories for the configuration settings 206. Further, as illustrated in FIG. 4B, when a user selects a category within the list 402, e.g., "Privacy" in this non-limiting example, the configuration GUI may present a list 404 of individual settings of the configuration settings 206. Further, as illustrated in FIG. 4C, upon selection of an individual setting control, e.g., "Location" in this non-limiting example, the configuration GUI 300 may display modifiable settings 406 for the selected configuration setting 206. As described in detail herein, modification to the selected configuration setting 206 may be applied to the applications executing on the host operating system 102 (e.g., synchronization client 104, the plurality of other applications 204(1)-(N)) and applications executing on the guest operating systems 108(1)-(N) (e.g., guest application 112(1)).

Example Process

The processes described in FIG. 5 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the computing device 100. By way of example and not limitation, the method 500 is described in the context of the computing device 100 of FIGS. 1-2 and 6, and the GUIs of FIGS. 3A-3C and 4A-4C. For example, the operations may be performed by one or more of the host operating system 102, the synchronization client 104, the virtual machine 106(1)-(N), the guest operating system 108, the synchronization application 110, the guest application 112(1), the virtual machine application 202, the synchronization manager 224, and/or the conversion module 226.

Figure 5:
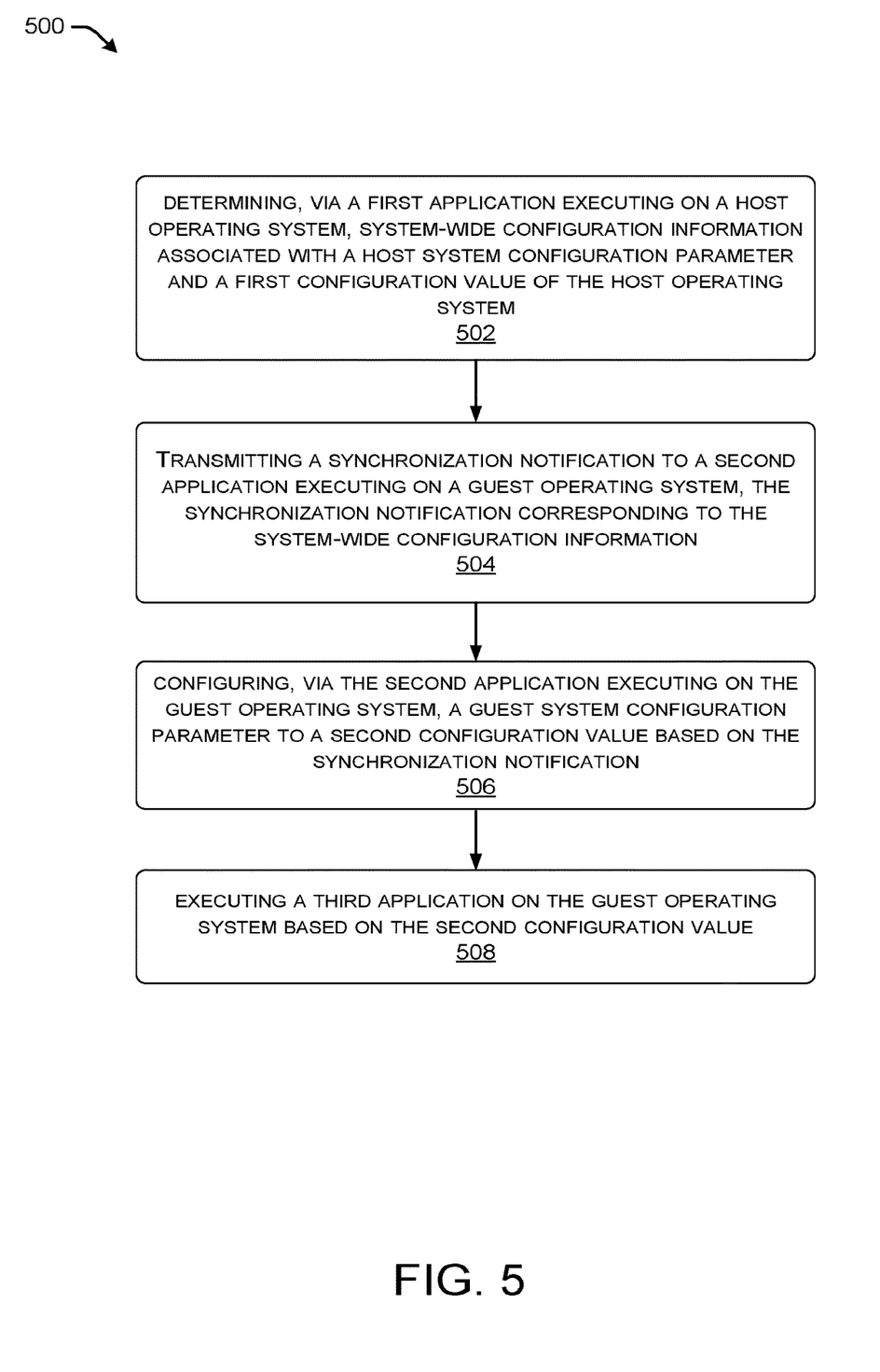
FIG. 5 is a flow diagram showing an example process for syncing configuration settings between incompatible operating systems, in accordance with some aspects of the present disclosure.

FIG. 5 is a flow diagram showing an example method 500 for synchronizing configuration setting across incompatible operating systems, in accordance with some aspects of the present disclosure.

At block 502, the computing device may determine, via a first application executing on a host operating system, system-wide configuration information associated with a host system configuration parameter and a first configuration value of the host operating system.

For example, the synchronization manager 214 may determine the configuration information 218 by transmitting a request to the host operating system 102 for the configuration settings 206 and/or transmitting a request to the operating system for any updates to the configuration settings 206 over a predefined period of time (e.g., since the last request was transmitted). In response, the host operating system 102 may transmit the configuration information 218 (i.e., the system-wide configuration information) to the synchronization client 104. Further, the configuration information 218 may include the configuration parameter "system language," and the configuration value "English." As another example, the synchronization manager 214 may configure a listener 212 to transmit a listener notification to the synchronization manager 214 when the configuration settings 206 have been updated. In some instances, the listener notification may include the configuration information 218. In some other instances, the synchronization client 104 may request and receive the configuration information 218 in response to receipt of the listener notification.

Accordingly, the computing device 100 or the processor 602 executing the synchronization client 104 may provide means for determining, via a first application executing on a host operating system, system-wide configuration information associated with a host system configuration parameter and a first configuration value of the host operating system.

At block 504, the computing device may transmit a synchronization notification to a second application executing on a guest operating system, the synchronization notification corresponding to the system-wide configuration information. For example, the synchronization manager 214 may transmit a synchronization notification 220(1) to the synchronization application 110. In some aspects, the synchronization client 104 may employ the conversion module 216 to convert the configuration information 218 to an intermediate representation, and transmit the intermediate representation within the synchronization notification 220 (1). As an example, the conversion module 216 may convert the configuration parameter "system language" to "locale," and the configuration value "English" to a language tag representing American English (e.g., "en-US").

Accordingly, the computing device 100 or the processor 602 executing the synchronization manager 214 may provide means for transmitting a synchronization notification to a second application executing on a guest operating system, the synchronization notification corresponding to the system-wide configuration information.

At block 506, the computing device may configure, via the second application executing on the guest operating system, a guest system configuration parameter to a second configuration value based on the synchronization notification. For example, the synchronization manager 224 may receive the synchronization notification 220(1) and configure the settings 222 of the guest operating system 108 based on the synchronization notification 220(1). In particular, the synchronization manager 224 may employ the conversion module 226 to convert the configuration parameter "locale" to "region," and "en-US" to "United States." Further, the synchronization manager 224 may set the "region" setting to "United States" within the settings 222 of the guest operating system 108 based upon the conversion operations Accordingly, the computing device 100, or the processor 602 executing the synchronization manager 224 may provide means for configuring, via the second application executing on the guest operating system, a guest system configuration parameter to a second configuration value based on the synchronization notification.

At block 508, the computing device may execute a third application on the guest operating system based on the second configuration value. For example, the guest application 112 will execute the guest application 112 with text and images in English based on the region setting in the settings 222.

Accordingly, the computing device 100, or the processor 602 executing the guest operating system 108 may provide means for executing a third application based on the second configuration value.

In an alternative or additional aspect, in order to determine the system-wide configuration information, the method 500 comprises transmitting, to the host operating system, a request for updates to a plurality of system-wide setting parameters of the host operating system, and receiving, in response to the request, the system-wide configuration information indicating a selection of the first configuration value for the host system configuration parameter. In an alternative or additional aspect, in order to determine the system-wide configuration information, the method 500 comprises receiving, from a listener registered to monitor for an update to the host system configuration parameter, the system-wide configuration information indicating a selection of the first configuration value.

In an alternative or additional aspect, in order to transmit the synchronization notification, the method 500 comprises converting at least one of the host system configuration parameter and/or the first configuration value to a platform independent intermediate representation. In an alternative or additional aspect, in order to configure the guest system configuration parameter, the method 500 comprises determining at least one of the guest system configuration parameter or the second configuration value based at least in part on the platform independent intermediate representation.

In an alternative or additional aspect, wherein the host system configuration parameter may be a first host system configuration parameter, the guest system configuration parameter may be first guest system configuration parameter, and the method 500 further comprises detecting a guest system request, initiated by a fourth application executing on the guest operating system, to modify a second guest system configuration parameter of the guest operating system; transmitting, by the second application to the first application, a configuration request corresponding to the second guest system configuration parameter; presenting, based on the configuration request, a host system configuration GUI configured to modify a second host system configuration parameter associated with the second guest system configuration parameter; receiving, via the host system configuration GUI, a user-submitted configuration value for the second host system configuration parameter; and executing a fifth application on the guest operating system or the host operating system based on the user-submitted configuration value.

In an alternative or additional aspect, the method 500 further comprises presenting a host system configuration GUI including a control for modifying configuration parameters of a plurality of applications executing on the host operating system and a plurality of applications executing on the guest operating system; transmitting, by the host operating system, a configuration request to modify a configuration parameter of a fourth application on the guest operating system based on a selection within the host system configuration GUI; and presenting, via a virtualization platform of the host operating system, a settings module of the fourth application.

In an alternative or additional aspect, the host system configuration parameter includes at least one of a language setting, a date setting, a time setting, an accessibility setting, a battery setting, a location information setting, a user setting, and/or a privacy setting.

While the operations are described as being implemented by one or more computing devices, in other examples various systems of computing devices may be employed. For instance, a system of multiple devices may be used to perform any of the operations noted above in conjunction with each other. For example, a car with an internal computing device along with a mobile computing device may be employed in conjunction to perform these operations.

Illustrative Computing Device

Figure 6:
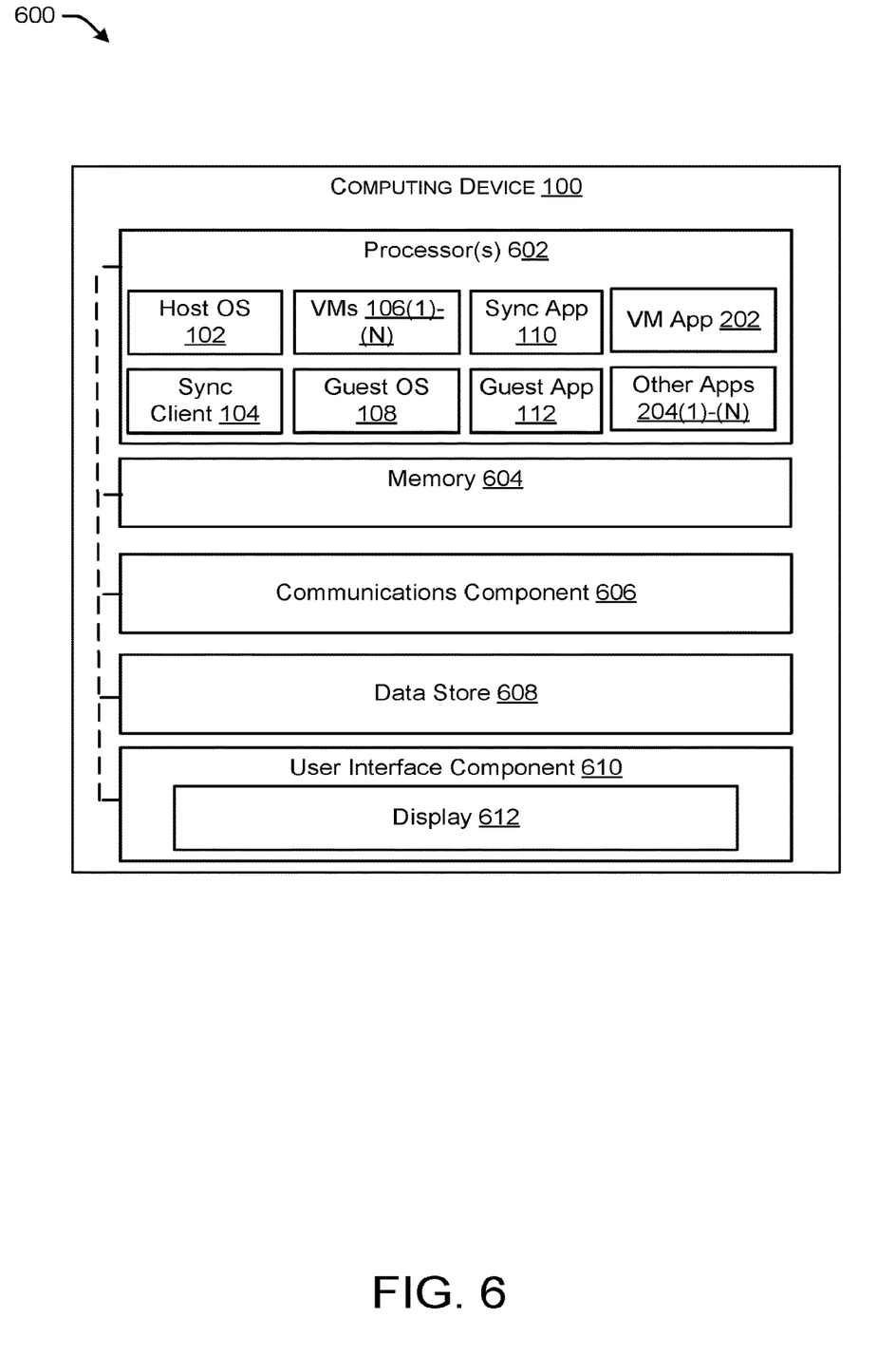
FIG. 6 is a schematic block diagram of example components of the computing device of FIG. 1, according to aspects of the present disclosure in accordance with some aspects of the present disclosure.

Referring now to FIG. 6, an example 600 of the computing device 100 in accordance with an implementation includes additional component details as compared to FIGS. 1-2. In one example, the computing device 100 includes the processor 602 for carrying out processing functions associated with one or more of components and functions described herein. The processor 602 can include a single or multiple set of processors or multi-core processors. Moreover, the processor 602 may be implemented as an integrated processing system and/or a distributed processing system. In an example, the processor 602 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 602 may include other processing components such as one or more arithmetic logic units (ALUs), registers, or control units.

In an example, the computing device 100 also includes the memory 604 for storing instructions executable by the processor 602 for carrying out the functions described herein. The memory 604 may be configured for storing data and/or computer-executable instructions defining and/or associated with the host operating system 102, synchronization client 104, the virtual machines 106(1)-(N), the guest operating system 108, the synchronization application 110, the guest applications 112(1)-(N), the virtual machine application 202, and the plurality of other applications 204(1)-(N), and the processor 602 may execute the host operating system 102, synchronization client 104, the virtual machines 106(1)-(N), the guest operating system 108, the synchronization application 110, the guest applications 112(1)-(N), the virtual machine application 202, and the plurality of other applications 204(1)-(N). An example of memory 604 may include, but is not limited to, a type of memory usable by a computer, such as random access memory (RAM), read only memory (ROM), tapes, magnetic discs, optical discs, volatile memory, non-volatile memory, and any combination thereof. In an example, the memory 604 may store local versions of applications being executed by processor 602.

The example computing device 100 also includes a communications component 606 that provides for establishing and maintaining communications with one or more parties utilizing hardware, software, and services as described herein. The communications component 606 may carry communications between components on the computing device 100, as well as between the computing device 100 and external devices, such as devices located across a communications network and/or devices serially or locally connected to the computing device 100. For example, the communications component 606 may include one or more buses, and may further include transmit chain components and receive chain components associated with a transmitter and receiver, respectively, operable for interfacing with external devices.

The example computing device 100 also includes a data store 608, which may be any suitable combination of hardware and/or software, that provides for mass storage of information, databases, and programs employed in connection with implementations described herein. For example, the data store 608 may be a data repository for the host operating system 102, synchronization client 104, the virtual machines 106(1)-(N), the guest operating system 108, the synchronization application 110, the guest applications 112 (1)-(N), the virtual machine application 202, and the plurality of other applications 204(1)-(N).

The example computing device 100 also includes a user interface component 610 operable to receive inputs from a user of the computing device 100 and further operable to generate outputs for presentation to the user. The user interface component 610 may include one or more input devices, including but not limited to a keyboard, a number pad, a mouse, a touch-sensitive display (e.g., display 612), a digitizer, a navigation key, a function key, a microphone, a voice recognition component, any other mechanism capable of receiving an input from a user, or any combination thereof. Further, the user interface component 610 may include one or more output devices, including but not limited to a display (e.g., display 612), a speaker, a haptic feedback mechanism, a printer, any other mechanism capable of presenting an output to a user, or any combination thereof.

In an implementation, the user interface component 610 may transmit and/or receive messages corresponding to the operation of the host operating system 102, synchronization client 104, the virtual machines 106(1)-(N), the guest operating system 108, the synchronization application 110, the guest applications 112(1)-(N), the virtual machine application 202, and the plurality of other applications 204(1)-(N). In addition, the processor 602 executes the host operating system 102, synchronization client 104, the virtual machines 106(1)-(N), the guest operating system 108, the synchronization application 110, the guest applications 112(1)-(N), the virtual machine application 202, and the plurality of other applications 204(1)-(N), and the memory 604 or the data store 608 may store them.

While the host operating system 102, synchronization client 104, the virtual machines 106(1)-(N), the guest operating system 108, the synchronization application 110, the guest applications 112(1)-(N), the virtual machine application 202, and the plurality of other applications 204(1)-(N), are illustrated as part of the processor 602, implementations of the present disclosure are not limited to this example, in other examples, the host operating system 102, synchronization client 104, the virtual machines 106(1)-(N), the guest operating system 108, the synchronization application 110, the guest applications 112(1)-(N), the virtual machine application 202, and the plurality of other applications 204(1)-(N), may be implemented in one or more components/subcomponents of the computing device 100.

EXAMPLE CLAUSES

The following example clauses describe various aspects of the present disclosure.

A. A method comprising: determining, via a first application executing on a host operating system, system-wide configuration information associated with a host system configuration parameter and a first configuration value of the host operating system; transmitting a synchronization notification to a second application executing on a guest operating system, the synchronization notification corresponding to the system-wide configuration information; configuring, via the second application executing on the guest operating system, a guest system configuration parameter to a second configuration value based on the synchronization notification; and executing a third application on the guest operating system based on the second configuration value.

B. The method as clause A recites, wherein determining the system-wide configuration information comprises: transmitting, to the host operating system, a request for updates to a plurality of system-wide setting parameters of the host operating system; and receiving, in response to the request, the system-wide configuration information indicating a selection of the first configuration value for the host system configuration parameter.

C. The method as clause A recites, wherein determining the system-wide configuration information comprises receiving, from a listener registered to monitor for an update to the host system configuration parameter, the system-wide configuration information indicating a selection of the first configuration value.

D. The method as any of clauses A-C recite, wherein transmitting the synchronization notification comprises: converting at least one of the host system configuration parameter and/or the first configuration value to a platform independent intermediate representation.

E. The method as any of clause E recites, wherein configuring the guest system configuration parameter comprises: determining at least one of the guest system configuration parameter or the second configuration value based at least in part on the platform independent intermediate representation.

F. The method as any of clause A-E recite, wherein the host system configuration parameter is a first host system configuration parameter, the guest system configuration parameter is a first guest system configuration parameter, and further comprising: detecting a guest system request, initiated by a fourth application executing on the guest operating system, to modify a second guest system configuration parameter of the guest operating system; transmitting, by the second application to the first application, a configuration request corresponding to the second guest system configuration parameter; presenting, based on the configuration request, a host system configuration graphical user interface (GUI) configured to modify a second host system configuration parameter associated with the second guest system configuration parameter; receiving, via the host system configuration GUI, a user-submitted configuration value for the second host system configuration parameter; and executing a fifth application on the guest operating system or the host operating system based on the user-submitted configuration value.

G. The method as any of clauses A-F recite, further comprising presenting a host system configuration graphical user interface (GUI) including a control for modifying configuration parameters of a plurality of applications executing on the host operating system and a plurality of applications executing on the guest operating system; transmitting, by the host operating system, a configuration request to modify a configuration parameter of a fourth application on the guest operating system based on a selection within the host system configuration GUI; and presenting, via a virtualization platform of the host operating system, a settings module of the fourth application.

H. The method as any of clauses A-G recite, wherein the host system configuration parameter includes at least one of a language setting, a date setting, a time setting, an accessibility setting, a battery setting, a location information setting, a user setting, and/or a privacy setting.

I. A device comprising: a memory; and at least one processor coupled to the memory and configured to: determine, via a first application executing on a host operating system, system-wide configuration information associated with a host system configuration parameter and a first configuration value of the host operating system; transmit a synchronization notification to a second application executing on a guest operating system, the synchronization notification corresponding to the system-wide configuration information; configure, via the second application executing on the guest operating system, a guest system configuration parameter to a second configuration value based on the synchronization notification; and execute a third application on the guest operating system based on the second configuration value.

J. The device as clause I recites, wherein to determine the system-wide configuration information, the at least one processor is configured to: transmit, to the host operating system, a request for updates to a plurality of system-wide setting parameters of the host operating system; and receive, in response to the request, the system-wide configuration information indicating a selection of the first configuration value for the host system configuration parameter.

K. The device as clause I recites, wherein to determine the system-wide configuration information, the at least one processor is configured to: receive, from a listener registered to monitor for an update to the host system configuration parameter, the system-wide configuration information indicating a selection of the first configuration value.

L. The device as any of clauses I-K recites, wherein to transmit the synchronization notification, the at least one processor is configured to: convert at least one of the host system configuration parameter and/or the first configuration value to a platform independent intermediate representation.

M. The device as clause L recites, further comprising determining at least one of the guest system configuration parameter or the second configuration value based at least in part on the platform independent intermediate representation.

N. The device as any of clauses I-M recites, wherein the host system configuration parameter is a first host system configuration parameter, the guest system configuration parameter is a first guest system configuration parameter, the at least one processor is configured to: detect a guest system request, initiated by a fourth application executing on the guest operating system, to modify a second guest system configuration parameter of the guest operating system; transmit, by the second application to the first application, a configuration request corresponding to the second guest system configuration parameter; present, based on the configuration request, a host system configuration graphical user interface (GUI) configured to modify a second host system configuration parameter associated with the second guest system configuration parameter; receive, via the host system configuration GUI, a user-submitted configuration value for the second host system configuration parameter; and execute a fifth application on the guest operating system or the host operating system based on the user-submitted configuration value.

O. The device as any of clauses I-N recites, wherein the at least one processor is configured to: present a host system configuration graphical user interface (GUI) including a control for modifying configuration parameters of a plurality of applications executing on the host operating system and a plurality of applications executing on the guest operating system; transmit, by the host operating system, a configuration request to modify a configuration parameter of a fourth application on the guest operating system based on a selection within the host system configuration GUI; and present, via a virtualization platform of the host operating system, a settings module of the fourth application.

P. The device as any of clauses I-O recites, wherein the host system configuration parameter includes at least one of a language setting, a date setting, a time setting, an accessibility setting, a battery setting, a location information setting, a user setting, and/or a privacy setting.

Q. One or more non-transitory computer-readable media encoded with instructions that, when executed by one or more processors, configure a computing device to perform a computer-implemented method as any of clauses A-H recite.

R. A device comprising one or more processors and one or more computer-readable media encoded with instructions that, when executed by the one or more processors, configure a computer to perform a computer-implemented method as any of clauses A-H recite.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A computer-implemented method comprising:
   determining, via a first application executing on a host operating system, system-wide configuration information associated with a host system configuration parameter and a first configuration value of the host operating system;
   transmitting a synchronization notification to a second application executing on a guest operating system that is incompatible with the host operating system, the synchronization notification corresponding to the system-wide configuration information;
   configuring, via the second application executing on the guest operating system, a guest system configuration parameter to a second configuration value based on the synchronization notification, wherein at least one of:
      the host system configuration parameter is different from the guest system configuration parameter; or
      the first configuration value is different from the second configuration value; and
   executing a third application on the guest operating system based on the second configuration value.

2. The method of claim 1, wherein determining the system-wide configuration information comprises:
   transmitting, to the host operating system, a request for updates to a plurality of system-wide setting parameters of the host operating system; and
   receiving, in response to the request, the system-wide configuration information indicating a selection of the first configuration value for the host system configuration parameter.

3. The method of claim 1, wherein determining the system-wide configuration information comprises receiving, from a listener registered to monitor for an update to the host system configuration parameter, the system-wide configuration information indicating a selection of the first configuration value.

4. The method of claim 1, wherein transmitting the synchronization notification comprises:
   converting at least one of the host system configuration parameter and/or the first configuration value to a platform independent intermediate representation.

5. The method of claim 4, wherein configuring the guest system configuration parameter comprises:
   determining at least one of the guest system configuration parameter or the second configuration value based at least in part on the platform independent intermediate representation.

6. The method of claim 4, wherein the host system configuration parameter is converted to the platform independent intermediate representation.

7. The method of claim 4, wherein the first configuration value is converted to the platform independent intermediate representation.

8. The method of claim 1, wherein the host system configuration parameter includes at least one of a language setting, a date setting, a time setting, an accessibility setting, a battery setting, a location information setting, a user setting, and/or a privacy setting.

9. A device comprising:
   a memory; and
   at least one processor coupled to the memory and configured to:
      determine, via a host application executing on a host operating system, system-wide configuration information associated with a host system configuration parameter and a first configuration value of the host operating system;
      transmit a synchronization notification to a first guest application executing on a guest operating system that is incompatible with the host operating system, the synchronization notification corresponding to the system-wide configuration information;
      configure, via the first guest application executing on the guest operating system, a guest system configuration parameter to a second configuration value based on the synchronization notification
      execute a second guest application on the guest operating system based on the second configuration value;
      receive, via the host application, a change to an application-level setting of the second guest application; and
      transmit a configuration request to the guest operating system to cause the application-level setting to be implemented by the second guest application.

10. The device of claim 9, wherein to determine the system-wide configuration information, the at least one processor is configured to:
   transmit, to the host operating system, a request for updates to a plurality of system-wide setting parameters of the host operating system; and
   receive, in response to the request, the system-wide configuration information indicating a selection of the first configuration value for the host system configuration parameter.

11. The device of claim 9, wherein to determine the system-wide configuration information, the at least one processor is configured to:
   receive, from a listener registered to monitor for an update to the host system configuration parameter, the system-wide configuration information indicating a selection of the first configuration value.

12. The device of claim 9, wherein to transmit the synchronization notification, the at least one processor is configured to:
   convert at least one of the host system configuration parameter and/or the first configuration value to a platform independent intermediate representation.

13. The device of claim 12, wherein the at least one processor is configured to:
   determine at least one of the guest system configuration parameter or the second configuration value based at least in part on the platform independent intermediate representation.

14. The device of claim 9, wherein the host system configuration parameter includes at least one of a language setting, a date setting, a time setting, an accessibility setting, a battery setting, a location information setting, a user setting, and/or a privacy setting.

15. A non-transitory computer-readable device having instructions thereon that, when executed by at least one computing device, causes the at least one computing device to perform operations comprising:
- determining, via a first application executing on a host operating system, system-wide configuration information associated with a host system configuration parameter and a first configuration value of the host operating system;
- determining, via the first application, configuration format of a guest operating system that is incompatible with the host operating system;
- based on the determined configuration format, generating a destination representation of the system-wide configuration information;
- transmitting a synchronization notification to a second application executing on the guest operating system, the synchronization notification including the destination representation;
- configuring, via the second application executing on the guest operating system, a guest system configuration parameter to a second configuration value based on the synchronization notification, wherein at least one of:
  - the host system configuration parameter is different from the guest system configuration parameter; or
  - the first configuration value is different from the second configuration value; and
- executing a third application on the guest operating system based on the second configuration value.

16. The non-transitory computer-readable device of claim 15, wherein the operations further comprise converting the host system configuration parameter and the first configuration value to platform independent intermediate representations.

17. The non-transitory computer-readable device of claim 16, wherein the operations comprise determining the guest system configuration parameter and the second configuration value based on the platform independent intermediate representations.

18. The non-transitory computer-readable device of claim 15, wherein the host system configuration parameter includes at least one of a language setting, a date setting, a time setting, an accessibility setting, a battery setting, a location information setting, a user setting, and/or a privacy setting.

19. The system of claim 9, wherein the second guest application is registered with the host operating system.

20. The system of claim 9, wherein the at least one processor is further configured to:
- display, by the host application, a user interface displaying a list of applications executing on the host operating system and the guest operating system, including the second guest application;
- receive a selection of the second guest application; and
- in response to receiving the selection of the second guest application, display modifiable settings for the second guest application including the application-level setting.

* * * * *